United States Patent
Takiguchi et al.

[11] Patent Number: 5,804,074
[45] Date of Patent: Sep. 8, 1998

[54] POROUS PLASTIC FILTER AND PROCESS FOR ITS PRODUCTION

[75] Inventors: Yoshimi Takiguchi; Yosuke Egawa; Takayuki Watanabe; Hiroharu Masano, all of Hiratsuka, Japan

[73] Assignee: Mitsubishi Plastics, Inc., Tokyo, Japan

[21] Appl. No.: 643,455

[22] Filed: May 8, 1996

[30] Foreign Application Priority Data

May 16, 1995 [JP] Japan .................................. 7-117142

[51] Int. Cl.⁶ .................................................. B01D 39/16
[52] U.S. Cl. .................. 210/497.01; 210/510.1; 210/503; 428/315.7; 428/316.6; 428/317.9; 264/127; 264/290.2
[58] Field of Search ............................ 210/497.01, 510.1, 210/503; 428/315.5, 315.7, 316.6, 317.9; 264/127, 290.2

[56] References Cited

U.S. PATENT DOCUMENTS

| | | |
|---|---|---|
| 4,212,733 | 7/1980 | Goto et al. . |
| 4,820,787 | 4/1989 | Kataoka et al. ........................ 264/127 |
| 4,824,898 | 4/1989 | Sukigara et al. ........................ 524/101 |

FOREIGN PATENT DOCUMENTS

| | | |
|---|---|---|
| 0 320 228 | 7/1981 | European Pat. Off. . |
| 3024324 | 1/1982 | Germany . |
| WO 85/04365 | 10/1985 | WIPO . |
| WO 93/19832 | 10/1993 | WIPO . |

OTHER PUBLICATIONS

Derwent Abstracts, Derwent Publications, AN 81-63152D, JP-A-56-085475, Jul. 11, 1981.

S. Strauss, Technische Mitteilungen, vol. 85, No. 2, pp. 100-104, Jul. 1, 1992, "Gesinterte Kunststoff-Formteile für die Fest-/Flüssig-Filtration".

Primary Examiner—W. L. Walker
Attorney, Agent, or Firm—Oblon, Spivak, McClelland, Maier & Neustadt, P.C.

[57] ABSTRACT

A porous plastic filter for separating fine particles, which is obtained by sinter-forming particles of thermoplastic material, wherein the contact angle to water of at least one surface of the porous plastic filter is at least 60°, preferably at least 90°, and at least a thermoplastic material having an average particle size within a range of from 5 to 90 μm, is used.

27 Claims, 2 Drawing Sheets

POROUS PLASTIC FILTER AND PROCESS FOR ITS PRODUCTION

The present invention relates to a porous plastic filter for separating, by filtration, fine particles contained in a fluid such as a liquid or gas, and a process for its production.

Heretofore, a number of porous filters have been known to separate, by filtration, fine particles such as dust contained in a fluid such as a liquid or gas. Among them, various filters have been proposed which are provided with both non-tackiness to facilitate removal of fine particles attached to the filter surface and a high level of ability of collecting fine particles on the filter surface. For example, a porous filter is known in which on the surface of a porous substrate prepared by sinter-forming a plastic material such as polyethylene, polypropylene, polysulfone, polyethersulfone or polyphenylene sulfide, having a relatively large average particle size, fine particles having an average particle size smaller than the above plastic material and excellent in the non-tackiness against fine particles such as dust, such as particles of polytetrafluoroethylene (hereinafter referred to PTFE), are directly coated together with an adhesive, to improve the dust removal performance and the performance for collecting fine particles on its surface.

However, with such a porous filter, PTFE used is inferior in adhesive properties to the porous substrate, whereby the adhesive properties at the interface between the porous substrate and PTFE tend to be inadequate, and PTFE particles are likely to fall off from the porous substrate during filtration or back washing. Consequently, there have been problems such that the performance for removal of fine particles deteriorates, the ability of collecting fine particles on the filter surface deteriorates, or the PTFE particles thus fallen off are likely to be included in the collected fine particles.

Further, a method of coating the surface of the porous substrate with a PTFE porous film having a smaller pore diameter than the porous substrate, has been proposed. However, like the above case, there has been a problem that the adhesion to the substrate is inadequate, or a problem that the PTFE porous film itself is expensive, and the production cost will thereby be high.

As a result of an extensive research, the present inventors have found a plastic filter having excellent non-tackiness and ability of collecting fine particles on the filter surface and a process for its production, without adopting the above-mentioned complicated structure for the filter.

The present present invention provides a porous plastic filter for separating fine particles, which is obtained by sinter-forming particles of thermoplastic material, wherein the contact angle to water of at least one surface of the porous plastic filter is at least 60°, preferably at least 90°, and at least a thermoplastic material having an average particle size within a range of from 5 to 90 μm, is used.

The present invention also provides a multilayer porous plastic filter made of sintered particles of thermoplastic material, which comprises at least two layers formed by combining and unifying (a) a small particle porous layer obtained by sinter-forming a particulate plastic material having a small average particle size, for either the side to which a fluid such as a liquid or gas containing fine particles to be removed by the porous plastic filter, flows in, or the side from which such a fluid flows out, and (b) a large particle porous layer obtained by sinter-forming a particulate plastic material having an average particle size larger than the average particle size of the plastic material for said small particle porous layer, for the other side, wherein the contact angle to water of the surface of said small particle porous layer is at least 60°, preferably at least 90°, and at least a thermoplastic material having an average particle size within a range of from 5 to 90 μm, is used for the small particle porous layer.

As a process for producing such a plastic filter, the present invention further provides a process for producing a multilayer porous plastic filter, which comprises assembling a molding tool comprising an inner mold and a replaceable outer mold to form a primary mold cavity capable of forming a layer thickness corresponding to particles of a thermoplastic material to be filled, then filing into this primary mold cavity at least a small particulate thermoplastic material having an average particle size within a range of from 5 to 90 μm or a large particulate thermoplastic material having an average particle size larger than the above average particle size, followed by sintering it to form a small particle porous layer or a large particle porous layer, then replacing the previously used outer mold with another outer mold having an inner diameter larger than the previously used outer mold, to form a secondary mold cavity on the outer surface side of the above porous layer, further filling into the secondary mold cavity a large particulate thermoplastic material having an average particle size larger than the above small particulate thermoplastic material, or the above small particulate thermoplastic material, followed by sintering it to form a large particle porous layer on the outer surface of the above small particle porous layer, or a small particulate porous layer on the outer surface of the large particle porous layer, so that the small particle porous layer having a contact angle to water of at least 60°, preferably at least 90°, is combined and unified with the large particle porous layer.

Still further, the present invention provides a process for producing a multilayer porous plastic filter, which comprises subjecting a particulate thermoplastic material having a predetermined average particle size to primary sintering to form a porous plastic substrate, imparting electrical conductivity by a conductive material to the surface of the porous portion of the substrate, then electrostatically coating at least a small particulate thermoplastic material which has a compatibility with the substrate and which has an average particle size within a range of from 5 to 90 μm which is smaller than the particles constituting the porous plastic substrate, then subjecting the porous plastic substrate to secondary sintering to form a small particle porous layer having pores with a diameter smaller than the pore diameter of the substrate at least on the porous portion of the porous plastic substrate, so that the small particle porous layer having a contact angle to water of at least 60°, preferably at least 90°, is coated and fused on the outer surface of the porous plastic substrate, and the small particle porous layer and the large particle porous layer are combined and unified.

Figure 1:
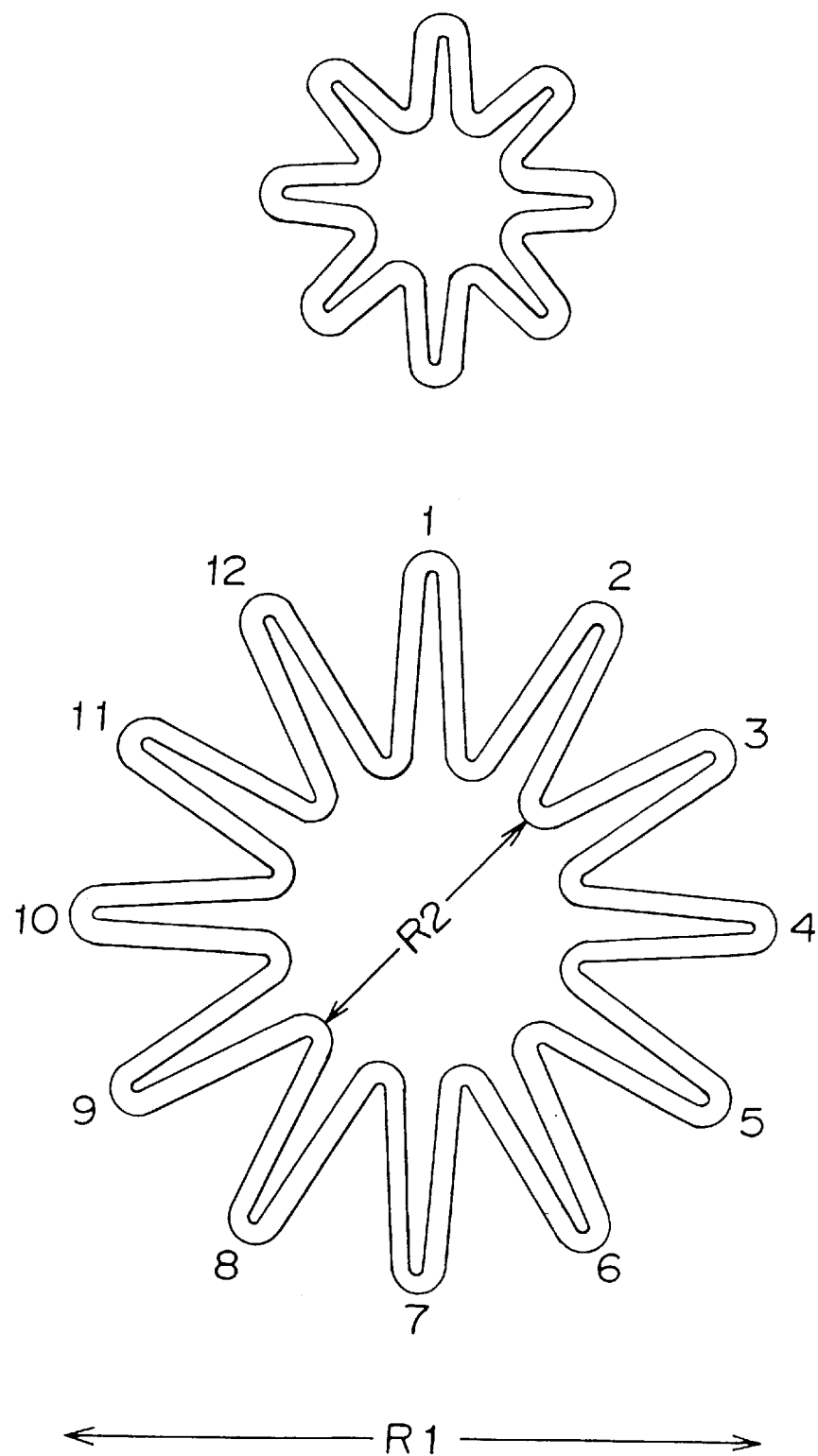
FIG. 1 is a cross-sectional view of a porous plastic filter having a star-shaped cross-section.

Now, the present invention will be described in detail with reference to the preferred embodiments.

The porous plastic filter of the present invention may be the one which is porous by itself and has a single layer structure, prepared by sinter-forming a thermoplastic material, or the one which is porous and has a multilayer structure, obtained by integrally laminating on such a layer another porous layer formed by sinter-forming a thermoplastic material having a different average particle size.

Namely, the porous plastic filter obtained by sinter-forming a thermoplastic material, according to the present invention, may be constituted by a single porous layer or a plurality of porous layers. However, it is important that the contact angle to water of the surface on either the side to which a fluid such as a liquid or gas containing fine particles, flows in or the side from which the fluid flows out, is at least 60°, preferably at least 90°, and at least a thermoplastic material having an average particle size within a range of from 5 to 90 μm, is used.

Here, the contact angle to water is represented by a numerical value for the contact angle measured by dropping 20 μl of deionized water on the surface of the porous plastic filter by a micro syringe, by means of a goniometer type contact angle measuring apparatus.

Further, it is important to use particles of thermoplastic material having an average particle size within a range of from 5 to 90 μm, preferably from 10 to 60 μm, to attain the contact angle to water of the filter surface being at least 60+, preferably at least 90°.

However, to the one having an average particle size within a range of from 5 to 90 μm, a thermoplastic material having a smaller average particle size or a larger average particle size may be incorporated in a predetermined amount, so long as the contact angle to water of the surface will be at least 60°, preferably at least 90°.

The amount for such incorporation may be at any level within a range where no such a phenomenon as non-uniform filling into the mold cavity which is likely to occur when particles with an average particle size of less than 5 μm are used alone, or no such a phenomenon as inadequate ability for collecting fine particles such as dust on the surface which is likely to occur when particles with an average particle size of at least 90 μm are used alone, will take place.

The thermoplastic material constituting the porous plastic filter of the present invention is not particularly limited, so long as it is a thermoplastic material from which a porous body can be obtained by sintering, such as a polyolefin resin such as polypropylene or polyethylene, e.g. ultrahigh molecular weight polyethylene or high density polyethylene, a polyvinyl chloride resin, a polyester resin such as polyallylate, a polyamide resin, a polystyrene resin, an acrylic resin, a fluorine-type resin, or a crosslinked polyolefin resin including low density polyethylene obtained by irradiation with radiation. Among these materials, it is preferred to use a material having a low melt flow rate (MFR) to obtain a porous plastic filter having a uniform pore size.

The crosslinked polyolefin resin can be prepared by irradiating ionizing radiation of e.g. γ-rays or x-rays to a polyolefin resin such as polypropylene or polyethylene, for example, low density polyethylene, medium density polyethylene or high density polyethylene, whereby a crosslinked polyolefin resin having a crosslinking degree of at least 10%, can be obtained at an absorbed dose of 10 KGy. Here, by crosslinking the polyolefin resin, it is possible to increase the molecular weight of the resin and thus to lower the melt flow rate. Accordingly, with a crosslinking degree of less than 10%, it tends to be difficult to obtain a porous plastic filter having a uniform pore size.

As a method for obtaining the surface condition where the contact angle to water is at least 60°, selection of the type or the average particle size of the thermoplastic material constituting the porous plastic filter may, for example, be mentioned.

In the case of a porous plastic filter of a single layer structure, the thermoplastic material constituting it may be selected, for use alone or in combination as a mixture, from the above-mentioned thermoplastic materials so long as the average particle size is within a range of from 5 to 90 μm so that the contact angle to water of the filter surface will be at least 60°. Preferred is the one wherein ultrahigh molecular weight polyethylene having an average particle size of from 5 to 90 μm, preferably from 10 to 60 μm, is used alone. However, it is possible to use the one prepared by mixing thereto a fluorine-type plastic material, a crosslinked polyolefin type plastic material including radiation-irradiated low density polyethylene or other selected thermoplastic material, or the one prepared by adding a thermoplastic material having an average particle size of larger than 90 μm, preferably ultrahigh molecular weight polyethylene having an average particle size of larger than 90 μm, to preferably ultrahigh molecular weight polyethylene having an average particle size of from 5 to 90 μm.

As the ultrahigh molecular weight polyethylene, the one having a viscosity average molecular weight of at least 1,000,000 is suitable for use.

The fluorine-type plastic material may be the one which is commonly known, such as polytetrafluoroethylene, polyfluoroacryl acrylate, polyvinylidene fluoride, polyvinyl fluoride or hexafluoropropylene. Polytetrafluoroethylene or polyfluoroacryl acrylate is particularly preferred from the viewpoint of imparting non-tackiness against fine particles such as dust.

The blend proportion of such a fluorine-type plastic material is usually within a range of from 0.1 to 50 wt %, preferably from 1 to 30 wt %, based on the total amount of plastic materials.

If the blend proportion is less than 0.1 wt %, the performance for removal of fine particles such as dust collected on the filter will be dependent on the performance by the thermoplastic material constituting the porous plastic filter, and the desired level of performance for removal of the fine particles can hardly be obtained. On the other hand, if the blend proportion exceeds 50 wt %, the strength of the sintered porous plastic filter tends to deteriorate substantially so that there will be a practical problem.

Further, it is possible to use a material prepared by adding a thermoplastic material having an average particle size of larger than 90 μm to a thermoplastic material having an average particle size within a range of from 5 to 90 μm, such as a material prepared by mixing ultrahigh molecular weight polyethylene having an average particle size of from 100 to 1,000 μm to ultrahigh molecular weight polyethylene having an average particle size of from 5 to 90 μm.

The blend proportions of such ultrahigh molecular weight polyethylenes are usually such that the polyethylene having an average particle size of from 5 to 90 μm is at least 20 wt %, preferably at least 40 wt %, based on the total amount.

In the case of a porous plastic filter of a multilayer structure i.e. a filter obtained by combining and unifying a small particle porous layer and a large particle porous layer, the thermoplastic materials constituting it may be such that for the small particle porous layer, the one having the same composition as in the case of the above-mentioned single layer structure may be used so long as the average particle size is within a range of from 5 to 90 μm so that the contact angle to water of the surface will be at least 60°, and for the large particle porous layer, a plastic material having an average particle size larger than the average particle size of the thermoplastic material constituting the above small particle porous layer, preferably ultrahigh molecular weight polyethylene, particularly botryoid ultrahigh molecular weight polyethylene having an average particle size of from 100 to 200 μm, may, for example, be used.

In the multilayer porous plastic filter, the small particle porous layer serves to provide excellent non-tackiness against fine particles such as dust and ability of collecting fine particles on the surface, and for this layer, the same thermoplastic material as described above for the porous plastic filter of a single layer structure, can suitably be used.

Whereas, the large particle porous layer has high strength with a low pressure loss, and for this layer, a polyolefin resin such as polypropylene or polyethylene, for example, ultra-high molecular weight polyethylene or high density polyethylene, a polyvinyl chloride resin, a polyester resin such as polyallylate, a polyamide resin, a polystyrene resin, or an acrylic resin, as described above for the small particle porous layer, may, for example, be used. The material is not particularly limited so long as it is a thermoplastic material having an average particle size of from 100 to 1,000 μm, preferably from 150 to 600 μm, from which a porous body can be obtained by sintering. For example, botryoid ultra-high molecular weight ethylenic polyolefin, specifically, the one having an average particle size of from 100 to 200 μm and a bulk density of from 0.35 to 0.45 g/cm$^2$, is preferred in view of e.g. the mechanical strength. If the average particle size exceeds 1,000 μm, the mechanical strength of the porous plastic filter tends to be inadequate, such being undesirable. Further, if the average particle size is less than 90 μm, the significance for making the porous plastic filter in a multilayer structure will be low.

The thickness relation between the small particle porous layer and the large particle porous layer is preferably such that the thickness ratio of the large particle porous layer is from 30 to less than 100% of the entire thickness of the filter. If the thickness ratio of the large particle porous layer is less than 30%, the pressure loss tends to be high, and the significance for a multilayer structure will be low.

Here, in addition to the above-mentioned effects, a multilayer porous plastic filter wherein the side from which a fluid flows out, is made of a small particle porous layer prepared by sinter-forming a thermoplastic material having a small average particle size, and the other side is made of a large particle porous layer prepared by sinter-forming a plastic material having an average particle size larger than the average particle size of the small particle porous layer, is capable of quickly collecting relatively large fine particles contained in the fluid by the large particle porous layer and later collecting relatively small fine particles and provides a merit such that by carrying out back washing to remove the fine particles at predetermined intervals, it is possible to eliminate or reduce the pressure loss.

As is apparent from the foregoing, the above multilayer porous plastic filter is not particularly limited with respect to the disposition of layers as between the fluid flow-in side and the flow-out side, so long as it has a multilayer structure comprising a large particle porous layer having a large pore size and a small particle porous layer having a small pore size. Namely, there is no practical problem in the performance of the filter, if the layer having a large pore size is disposed on the flow-in side or on the flow-out side. Further, the number of layers is not limited, and depending upon the required quality, layers with average particle sizes varied, may be provided so that the entire structure will be composed of two or more layers.

As a process for producing such as multilayer porous plastic filter, various processes are conceivable depending upon e.g. the shape of the filter. However, the following two processes are preferred from the viewpoint of the production efficiency or reliability in adjusting the thickness of each layer.

The first process is such that:

using a molding tool capable of forming a mold cavity to be filled with particles of the thermoplastic material, by an inner mold and a replaceable outer mold, (1) firstly, the replaceable outer mold is disposed outside the inner mold to form a primary mold cavity capable of forming a layer thickness corresponding to the average particle size of particles of a thermoplastic material to be filled, and into this primary mold cavity, a plastic material having a small average particle size or a large average particle size is filled and then sintered to form a porous plastic substrate for a small particle porous layer or a large particle porous layer;

(2) then, the previously used outer mold is removed and substituted by another outer mold having an inner diameter larger than the removed outer mold to form a secondary mold cavity on the outer surface side of the primary porous plastic substrate;

(3) then, into the secondary mold cavity, a large particle thermoplastic material having an average particle size larger than the above small particulate thermoplastic material, or the above small particulate thermoplastic material, is filled and then sintered to form a large particle porous layer on the outer surface side of the above small particle porous layer, or a small particle porous layer on the outer surface side of the large particle porous layer; and (4) the assembly is cooled, and the outer mold and the inner mold are removed, to obtain a multilayer porous plastic filter having a small particle porous layer having a contact angle to water of at least 60°, preferably at least 90°, combined and unified with a large particle porous layer.

The respective layers of the multilayer porous plastic filter are preferably made of the same type of thermoplastic material, which is convenient for sinter-forming and preferred from the viewpoint of the interlaminar adhesion between the adjacent layers.

The second process is such that:

(1) firstly, a thermoplastic material having a predetermined average particle size is subjected to primary sinter-forming to obtain a porous plastic substrate (such porous plastic substrate can be obtained by sinter-forming the thermoplastic material having a predetermined average particle size by a static forming method employing a molding tool comprising an outer mold of e.g. cylindrical shape and an inner mold to be inserted inside thereof, or a dynamic forming method such as a ram extrusion molding method, an injection molding method or a screw extrusion molding method); and (2) then, electrical conductivity is imparted by an electrical conductive material to the surface of the porous portion of the porous plastic substrate (the electrical conductivity may be imparted by a method of incorporating into the substrate an electrical conductive material such as carbon black, carbon fibers or a metal powder during the molding of the porous plastic substrate, or a method of coating a liquid of e.g. a surfactant on the surface of the porous plastic substrate after the molding, and the method of coating e.g. a surfactant is usually employed, but the method is not particularly limited so long as it is capable of imparting electrical conductivity at least to the surface of the porous plastic substrate);

(3) then, on the surface of the porous plastic substrate, a small particulate plastic material is coated and laminated by a coating method wherein a plastic material having compatibility with the surface of the porous plastic substrate and having an average particle size smaller than the particles constituting the porous plastic substrate, is sprayed and electrostatically coated on the surface; and (4) further, this porous plastic substrate is subjected to secondary sintering by e.g. a heating furnace set at a predetermined temperature, to obtain a multilayered porous plastic filter having a small particle porous layer having a contact angle to water of at least 60°, preferably at least 90°, combined and unified with a large particle porous layer.

The cross-sectional shape of the porous plastic filter is optionally selected from a square shape, an oval shape, a rectangular shape and a star shape (the cross section is fluted along the circumference) as well as a circular shape.

The molding tool to be used for forming such a filter is a molding tool comprising an outer mold and an inner mold in the above-mentioned static forming method, or an extruder die or an injection molding die in the dynamic forming method to conform with such a cross-sectional shape of the porous plastic filter.

Referring to FIG. 1, the star-shape is a cross section of a hollow cylinder having a predetermined thickness with a fluted shape with outwardly extended n flutes and inwardly extended n flutes, obtained by sinter-forming particles of a thermoplastic material. The star-shape can be defined by the outer diameter R1 of the outwardly extended flutes 1 to 12, the inner diameter R2 of the inwardly extended flutes, the thickness and the number of flutes. However, the shape is selected within such ranges that the outer diameter R1 is from 20 to 150 mm, the inner diameter R2 is from 12 to 120 mm, the thickness is from 1 to 5 mm and the number of flutes is from 5 to 25, taking into consideration the strength of the sinter-formed porous plastic filter, the desired filtration area per volume, the installation area for the separation apparatus and further the type of the plastic material constituting the filter.

The porous plastic filter may have either a hollow short shape or a hollow long shape and may be molded to meet the shape of a separation apparatus which will be described hereinafter.

Usually, a plurality of such porous plastic filters are used in combination to form a filter unit. The filter unit will be used as a separating apparatus, in such a form as suspended in a container having a prescribed shape.

Figure 2:
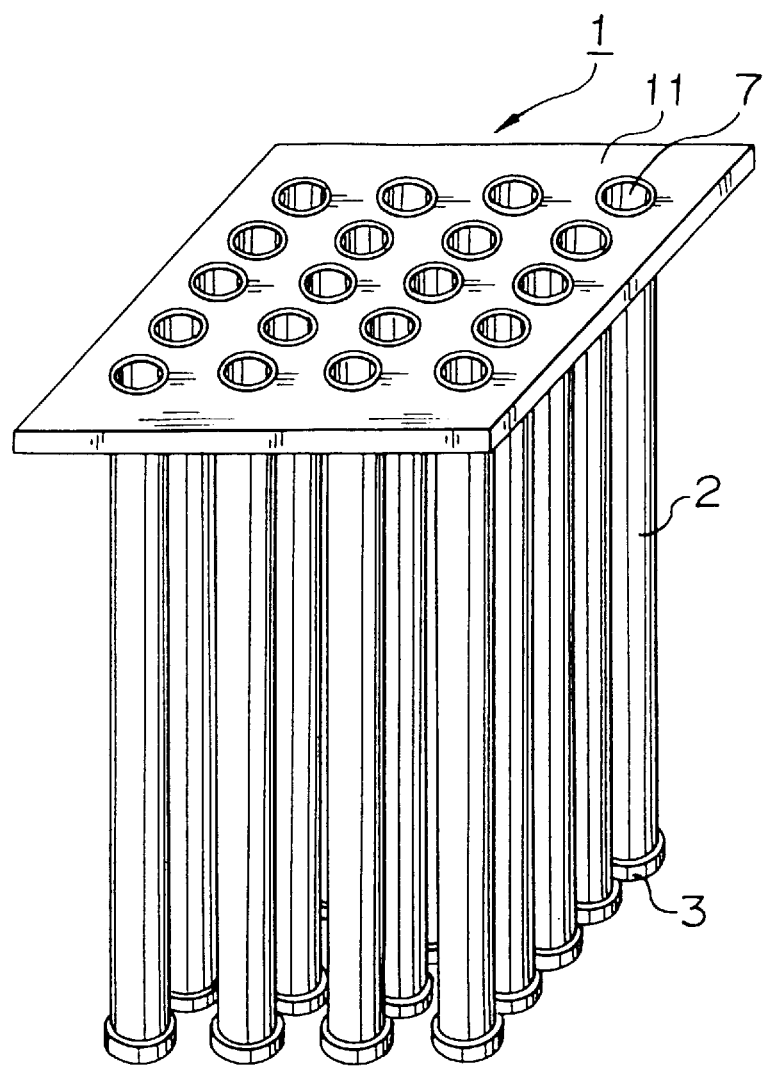
FIG. 2 is a perspective view of a filter unit comprising a plurality of porous plastic filters of the present invention.

Referring to FIG. 2, a filter unit 1 comprises a support 11 of a plate shape and porous plastic filters 2 attached thereto. Namely, one end 7 of each plastic filter is inserted into a perforated support, and the inserted portion is sealed, while the opening at the other end is sealed with a cover 3. This support 11 and the cover 3 may be made of a metal or various synthetic resin, for example, a thermoplastic resin such as a hard polyolefin resin or a polyvinyl chloride, or a reactive thermosetting resin. However, a reactive liquid polyurethane resin is preferred from the viewpoint of the moldability or the dimensional stability.

When it is required to impart electrical conductivity to this filter unit, carbon black is added in an amount of from about 1 to 10% to ultrahigh molecular weight polyethylene at the time of sinter-forming the porous plastic filter, and also for the support and the cover, an electrically conductive material having carbon black likewise incorporated, may be used.

Further, in the case of using a reactive liquid polyurethane resin, it is preferred to use the one having from 3 to 10 wt % of carbon fibers with an average fiber length of from 0.1 to 1.0 mm incorporated to the polyol and the curing agent, as the main agents, whereby the residual strain will be small, and high dimensional stability and antistatic properties will be secured.

Now, the present invention will be described in further detail with reference to Examples. However, it should be understood that the present invention is by no means restricted to such specific Examples.

Test Nos. 1 to 4

The respective filters were prepared in the manner as described hereinafter, and the filter properties were evaluated by the following methods. The results are shown in Table 1.

Presence or absence of falling off of particles

Symbol ○ indicates that no falling off of filter particles is observed at the time of back washing; symbol Δ indicates that slight falling off of filter particles is observed at the time of back washing; and symbol x indicates that substantial falling off of filter particles is observed at the time of back washing.

Here, the filter particles mean particles having non-tackiness, provided on the filter surface, or the plastic constituting the filter.

Powder removal property

Symbol ⊚ indicates that removal by back washing of fine particles deposited on the filter surface is excellent; symbol ○ indicates that removal by back washing of fine particles deposited on the filter surface is good; symbol Δ indicates that removal by back washing of fine particles deposited on the filter surface is slightly poor; symbol x indicates that removal by back washing of fine particles deposited on the filter surface is poor.

Fine particle collecting property

Symbol ○ indicates that no inclusion of wiped off fine particles in the flow-out fluid is observed; symbol Δ indicates that slight inclusion of wiped off fine particles in the flow-out fluid is observed; symbol Δ indicates that substantial inclusion of wiped off fine particles in the flow-out fluid is observed.

Contact angle to water (°)

Represented by a numerical value measured by goniometer type contact angle measuring apparatus (G-1 Model, manufactured by Elmar K. K.).

Pressure loss (mmAq)

Represented by the value when an air containing no fine particles is suctioned at a rate of 1 mm/min.

Test No. 1

Ultrahigh molecular weight polyethylene having an average particle size of 30 μm, a viscosity average molecular weight of 2,000,000 and a melt flow rate of not higher than 0.01, was filled in a mold cavity formed by cylindrical inner and outer molds each having a circular cross section, which had a width required to obtain a final thickness of a porous plastic filter of 2 mm, and then heated for from 30 to 90 minutes at a temperature of from 160° to 220° C. to obtain a porous plastic filter of a cylindrical shape with a wall thickness of 2 mm.

Test No. 2

Ultrahigh molecular weight polyethylene having an average particle size of 110 μm, a viscosity average molecular weight of 4,000,000 and a melt flow rate of not higher than 0.01, was filled in a mold cavity formed by cylindrical inner and outer molds each having a circular cross section, which had a width required to obtain a final thickness of a porous plastic filter of 3 mm, and then heated for from 30 to 90 minutes at a temperature of from 160° to 220° C. to obtain a porous plastic filter of a cylindrical shape with a wall thickness of 3 mm.

Test No. 3

Ultrahigh molecular weight polyethylene having an average particle size of 30 μm, a viscosity average molecular weight of 2,000,000 and a melt flow rate of not higher than 0.01, was filled in a mold cavity formed by cylindrical inner and outer molds each having a circular cross section, which had a width required to obtain a final thickness of a porous plastic filter of 2 mm, and then heated for from 30 to 90 minutes at a temperature of from 160° to 220° C. Then, a surfactant was coated on the surface to obtain a porous plastic filter of a cylindrical shape with a wall thickness of 2 mm.

Test No. 4

Ultrahigh molecular weight polyethylene having an average particle size of 170 μm, a viscosity average molecular weight of 4,000,000 and a melt flow rate of not higher than 0.01, was filled in a mold cavity formed by cylindrical inner and outer molds each having a circular cross section, which had a width required to obtain a final thickness of a porous plastic filter of 2 mm, and then heated for from 30 to 90 minutes at a temperature of from 160° to 220° C., to obtain a porous plastic substrate of a cylindrical shape. Then, PTFE fine particles were sprayed together with a binder and coated on the surface of the porous plastic substrate, to obtain a porous plastic filter of a cylindrical shape with a wall thickness of 2 mm.

TABLE 1

|  | No. 1 | No. 2 | No. 3 | No. 4 |
| --- | --- | --- | --- | --- |
| Presence or absence of falling off of particles | ○ | ○ | ○ | X |
| Powder removal property | ○ | ○ | X | Δ |
| Fine particle collecting property | ○ | Δ | ○ | Δ |
| Contact angle to water (°) | 97 | 95 | 50 | 122 |
| Pressure loss (mmAq) | 70 | 40 | 70 | 20 |

As shown in Table 1, in Test No. 1, no falling off of particles or no inclusion of fine particles in the flowout side fluid was observed, and no problem was observed also with respect to the powder removal property. In Test No. 2, slight inclusion of fine particles in the flow-out side fluid was observed, since the pore size was large. In Test No. 3, the powder removal property was poor, and in Test No. 4, falling off of PTFE particles from the substrate was observed, and the powder removal property at the falled off portion was inadequate. In Test No. 4, defects were observed in all of the tested properties.

Test Nos. 5 to 9

The respective filters were prepared in the manner as described below, and the filter properties were evaluated in the same manner as described above. The results are shown in Table 2.

Ultrahigh molecular weight polyethylene having an average particle size of 40 μm, a viscosity average molecular weight of 2,000,000 and a melt flow rate of not higher than 0.01 and bulk ultrahigh molecular weight polyethylene having an average particle size of 150 μm, a viscosity average molecular weight of 4,000,000 and a melt flow rate of not higher than 0.01 were mixed in the proportions (wt %) as identified in Table 2 to obtain a composition. The composition was filled in a mold cavity formed by cylindrical inner and outer molds each having a circular cross section, which had a width required to obtain a final thickness of a porous plastic filter of 2 mm, and then heated for from 30 to 90 minutes at a temperature of from 160° to 220° C., to obtain a porous plastic filter of a cylindrical shape with a wall thickness of 2 mm.

TABLE 2

|  | No. 5 | No. 6 | No. 7 | No. 8 | No. 9 |
| --- | --- | --- | --- | --- | --- |
| Blend proportions (40 μm/150 μm) | 80/20 | 50/50 | 30/70 | 20/80 | 10/90 |
| Presence or absence of falling off of particles | ○ | ○ | ○ | ○ | ○ |
| Powder removal property | ○ | ○ | ○ | ○ | ○ |
| Fine particle collecting property | ○ | ○ | ○ | ○ | Δ |
| Contact angle to water (°) | 97 | 96 | 95 | 95 | 95 |
| Pressure loss (mmAq) | 68 | 44 | 35 | 24 | 15 |

As shown in Table 2, in each of Test Nos. 5. to 9, no problem was observed with respect to falling off of particles and powder removal property. With respect to the pressure loss, Test No. 5 shows a slightly high value, but there is no practical problem. In Test No. 9, wherein the proportion of the small average particle size material was low, slight inclusion of fine particles in the flow-out side fluid was observed, such being undesirable.

Test Nos. 10 and 11

The respective filters were prepared in the manner as described below, and the filter properties were evaluated by the methods as described above. The results are shown in Table 3.

Test No. 10

Ultrahigh molecular weight polyethylene having an average particle size of 30 μm, a viscosity average molecular weight of 2,000,000 and a melt flow rate of not higher than 0.01 and PTFE powder having an average particle size of 0.2 μm were mechanically mixed by a blender in such blend proportions that the ultrahigh molecular weight polyethylene would be 95 wt % and the PTFE powder would be 5 wt %, based on the total amount, to obtain a material to be sintered. This material was filled in the same molding tool as used in Test No. 1 and heated for from 30 to 90 minutes at a temperature of from 160° to 220° C. to obtain a porous plastic filter of a cylindrical shape with a wall thickness of 2 mm.

Test No. 11

Ultrahigh molecular weight polyethylene having an average particle size of 30 μm, a viscosity average molecular weight of 2,000,000 and a melt flow rate of not higher than 0.01 and a polyfluoroalkyl acrylate dissolved in a solvent were mechanically mixed by a blender in such blend proportions that the ultrahigh molecular weight polyethylene would be 99 wt % and the polyfluoroalkyl acrylate component would be 1 wt %, based on the total amount, to obtain a material to be sintered. This material was filled in the same molding tool as used in Test No. 1 and heated for 30 minutes at a temperature of from 160° to 220° C. to obtain a porous plastic filter of a cylindrical shape with a wall thickness of 2 mm.

Test No. 12

Ultrahigh molecular weight polyethylene having an average particle size of 30 μm, a viscosity average molecular weight of 2,000,000 and a melt flow rate of not higher than 0.01, was filled in the same molding tool as used in Test No. 1 and heated for 30 minutes at a temperature of from 160° to 220° C. to obtain a porous plastic filter of a cylindrical shape with a wall thickness of 2 mm composed solely of the ultrahigh molecular weight polyethylene.

TABLE 3

|  | No. 10 | No. 11 | No. 12 |
|---|---|---|---|
| Presence or absence of falling off of particles | ◯ | ◯ | ◯ |
| Powder removal property | ⊚ | ⊚ | ◯ |
| Fine particle collecting property | ◯ | ◯ | ◯ |
| Contact angle to water (°) | 120 | 115 | 97 |
| Pressure loss (mmAq) | 60 | 61 | 70 |

As shown in Table 3, in Test Nos. 10 and 11, there was no problem with respect to falling off of the filter material or the powder removal property, and the contact angle to water, which is an index for evaluation of the powder falling property, showed a large value.

The reason as to why PTFE particles did not fall off in Test No. 10, is not clearly understood at present. However, it may be that when the ultrahigh molecular weight polyethylene is melted and swelled in the mold, the PTFE particles are embedded to some extent in the interior of the particles of the ultrahigh molecular weight polyethylene.

On the other hand, the reason as to why the polyfluoroalkyl acrylate did not fall off in Test No. 11, is believed to be such that by the heating, lipophilic groups were oriented on the side of the ultrahigh molecular weight polyethylene particles and perfluoroalkyl groups are oriented in a high density on the surface side.

The products of Test Nos. 10 and 11 containing a fluorine-type plastic material are superior in performance to the product of Test No. 12 containing no fluorine-type plastic material.

In each of them, there is no practical problem with respect to the pressure loss.

Test Nos. 13 to 15

The respective filters were prepared in the manner as described below, and the filter properties were evaluated by the methods as described above. The results are shown in Table 4.

Test No. 13

A total of three molds i.e. one cylindrical inner mold which was a hollow elongated body of a circular cross section and two replaceable cylindrical outer molds having diameters larger than the cylindrical inner mold, were prepared. Firstly, ultrahigh molecular weight polyethylene having an average particle size of 160 μm, a viscosity average molecular weight of 4,000,000 and a melt flow rate of not higher than 0.01, was filled into a primary mold cavity of a molding tool comprising the cylindrical inner mold and the cylindrical outer mold having the primary mold cavity with a width required to obtain a layer thickness ratio of 70% of a final thickness of a porous plastic filter of 3 mm, and heated for from 30 to 90 minutes at a temperature of from 160° to 220° C. to obtain a large average particle size porous layer having a large pore size. Then, this cylindrical outer mold was replaced by another cylindrical outer mold having an inner diameter larger than the initial cylindrical outer mold to form a secondary mold cavity with a width required to obtain a layer thickness ratio of 30% of a final thickness of a porous plastic filter of 3 mm, outside the above large average particle size porous layer. Then, into this secondary mold cavity, ultrahigh molecular weight polyethylene having an average particle size of 30 μm, a viscosity average molecular weight of 2,000,000 and a melt flow rate of not higher than 0.01, was filled and heated for 30 minutes at a temperature of from 160° to 220° C. to obtain a porous plastic filter of a cylindrical shape with a total wall thickness of two layers of 3 mm, which comprised a small average particle size porous layer having a small pore size formed on the outer surface side of the cylinder i.e. on the fluid flow-in side and a large average particle size porous layer having a large pore size formed on the inner surface side of the cylinder i.e. on the fluid flow-out side.

Test No. 14

Using the same cylindrical inner and outer molds as used in Test No. 13, firstly, ultrahigh molecular weight polyethylene having an average particle size of 30 μm, a viscosity average molecular weight of 2,000,000 and a melt flow rate of not higher than 0.01, was filled in a primary mold cavity of a molding tool comprising the cylindrical inner mold and the cylindrical outer mold, having the first mold cavity with a width required to obtain a layer thickness ratio of 30% of a final thickness of a porous plastic filter of 3 mm, and heated for 30 minutes at a temperature of from 160° to 220° C. to obtain a small average particle size porous layer having a small pore size. Then, the cylindrical outer mold was replaced in the same manner as Test No. 13, and ultrahigh molecular weight polyethylene having an average particle size of 160 μm, a viscosity average molecular weight of 4,000,000 and a melt flow rate of not higher than 0.01, was filled in a secondary mold cavity formed by the outer surface of the above small average particle size porous layer and the changed cylindrical outer mold so that the layer thickness ratio would be 70% of the total thickness of the filter, and heated for 30 minutes at a temperature of from 160° to 200° C., to obtain a plastic filter of a cylindrical shape with a total wall thickness of two layers of 3 mm, which comprised a large average particle size porous layer having a large pore size formed on the outer surface side of the cylinder i.e. the fluid flow-in side and a small average particle size porous layer having a small pore size formed on the inner surface side of the cylinder i.e. the fluid flow-out side.

Test No. 15

Ultrahigh molecular weight polyethylene having an average particle size of 160 μm, a viscosity average molecular weight of 4,000,000 and a melt flow rate of not higher than 0.01, was filled in a mold cavity formed by cylindrical inner and outer molds each having a circular cross section, which had a width required to obtain a final thickness of a porous plastic filter of 3 mm, and then heated for from 30 to 90 minutes at a temperature of from 160° to 220° C. to obtain a porous plastic filter of a cylindrical shape with a wall thickness of 3 mm, composed solely of the ultrahigh molecular weight polyethylene.

TABLE 4

|  | No. 13 | No. 14 | No. 15 |
|---|---|---|---|
| Presence or absence of falling off of particles | ◯ | ◯ | ◯ |
| Powder removal property | ◯ | ◯ | ◯ |
| Fine particle collecting property | ◯ | ◯ | X |
| Contact angle to water (°) | 97 | 95 | 95 |
| Pressure loss (mmAq) | 51 | 48 | 8 |

As shown in Table 4, in Test Nos. 13 and 14, no falling off of particles or no inclusion of fine particles in the flow-out fluid was observed, and the pressure loss was small and thus not problematic. In Test No. 15, inclusion of fine particles in the flow-out side fluid was observed, since the pore size was large.

With respect to the pressure loss, there was no practical problem in each case, but the result in Test No. 15 was particularly good.

Test Nos. 16 and 17

The respective filters were prepared in the manner as described below, and the filter properties were evaluated by the methods as described above. The results are shown in Table 5.

Test No. 16

Ultrahigh molecular weight polyethylene having an average particle size of 170 μm, a viscosity average molecular weight of 4,000,000 and a melt flow rate of not higher than 0.01, was filled into a mold cavity formed by cylindrical inner and outer molds each having a circular cross section, which had a width required to obtain a final thickness of a porous plastic filter of 3 mm, and then heated for 60 minutes at a temperature of from 150° to 200° C. to obtain a porous plastic filter of a cylindrical shape with a wall thickness of 3 mm. On the surface of this porous plastic substrate, a surfactant was coated to impart electrical conductivity to the surface of the substrate. Then, ultrahigh molecular weight polyethylene having an average particle size of 30 μm, a viscosity average molecular weight of 2,000,000 and a melt flow rate of not higher than 0.01 was electrostatically coated by means of an automatic electrostatic coating machine at a working voltage of 60 kV under a spray air pressure of 1.5 kg/cm$^2$ to coat and laminate a porous layer having a thickness of 200 μm with the ultrahigh molecular weight polyethylene having an average particle size of 30 μm, a viscosity average molecular weight of 2,000,000, on the surface of the substrate. The coated substrate was further heated for 30 minutes in a heating furnace at a temperature of from 150° to 200° C. for sinter-forming to obtain a porous plastic filter of a cylindrical shape with a wall thickness of the two layers of about 3 mm, which had a porous layer having a pore size smaller than the pore size of the substrate, coated and fused to the surface of the substrate.

Test No. 17

Ultrahigh molecular weight polyethylene having an average particle size of 340 μm, a viscosity average molecular weight of 3,300,000 and a melt flow rate of not higher than 0.01, was sinter-molded by a ram extruder provided at its forward end with a die having a cylindrical opening with a width required to obtain a final thickness of a porous plastic filter of 3 mm, to obtain a porous plastic substrate of a cylindrical shape with a wall thickness of 3 mm.

This porous plastic substrate was subjected to electrostatic coating under the same electrostatic coating conditions as in Test No. 16 to coat and laminate a porous layer having a thickness of 200 μm with the ultrahigh molecular weight polyethylene having an average particle size of 30 μm, a viscosity average molecular weight of 2,000,000, on the surface of this substrate. This coated substrate was sinter-molded under the same heating conditions as in Test No. 16 to obtain a porous plastic filter of a cylindrical shape with a wall thickness of two layers of about 3 mm, which had a porous layer with a pore size smaller than the pore size of the substrate, coated and laminated on the surface of this substrate.

TABLE 5

|  | No. 16 | No. 17 |
| --- | --- | --- |
| Presence or absence of falling off of particles | ◯ | ◯ |
| Powder removal property | ◯ | ◯ |
| Fine particle collecting property | ◯ | ◯ |
| Contact angle to water (°) | 95 | 95 |
| Pressure loss (mmAq) | 9 | 9 |

As shown in Table 5, in Test Nos. 16 and 17 wherein a plastic material having a small average particle size was electrostatically coated, no falling off of particles or no inclusion of fine particles in the flow-out side fluid, was observed, and the products were excellent in the filter properties. Further, in each case, the results were good with respect to the pressure loss.

Test Nos. 18 and 19

The respective filters were prepared in the manner as described below, and the filter properties were evaluated by the methods as described above. The results are shown in Table 6.

Test No. 18

Using the same cylindrical inner and outer molds as used in Test No. 13, firstly, ultrahigh molecular weight polyethylene having an average particle size of 160 μm, a viscosity average molecular weight of 4,000,000 and a melt flow rate of not higher than 0.01, was filled into a primary mold cavity of a molding tool comprising cylindrical inner and outer molds, which had the primary mold cavity with a width required to obtain a layer thickness ratio of 70% of a final thickness of a porous plastic filter of 3 mm, and then heated for 30 minutes at a temperature of from 160° to 220° C. to obtain a large average particle size porous layer having a large pore size. Then, the cylindrical outer mold was replaced in the same manner as in Test No. 13, and a plastic material having a small average particle size having a crosslinking degree of 77% (melt flow rate: not higher than 0.01) obtained by irradiating γ-rays of 200 KGy to a low density polyethylene having an average particle size of 26 μm, was filled into a secondary mold cavity formed by the outer surface of the above large average particle size porous layer and the replaced cylindrical outer mold so that the layer thickness ratio would be 30% of the total thickness of the filter, and then heated for 30 minutes at a temperature of from 160° to 220° C., to obtain a plastic filter of a cylindrical shape with a total wall thickness of two layers of 3 mm, which had a small average particle size porous layer having a small pore size formed on the outer surface side of the cylinder i.e. on the fluid flow-in side and a large average particle size porous layer having a large pore size formed on the inner surface side of the cylinder i.e. the fluid flow-out side.

Test No. 19

A porous plastic filter of a pipe shape with a wall thickness of 3 mm was prepared from ultrahigh molecular weight polyethylene having an average particle size of 170 μm, a viscosity average molecular weight of 4,000,000 in the same manner as in Test No. 16. On the surface of this porous plastic substrate, a surfactant was coated to impart electrical conductivity to the surface of the substrate. Then, the same plastic material having a small average particle size with a crosslinking degree of 77% as used in Test No. 18, was electrostatically coated by the same electrostatic coating method as in Test No. 16 to coat and laminate a porous layer having a thickness of 70 μm with a crosslinked polyethylene having an average particle size of 26 μm, on the surface of the substrate. The coated substrate was further sinter-molded under the same heating conditions as in Test No. 16 to obtain a porous plastic filter of a cylindrical shape with a wall thickness of two layers of about 3 mm, having a porous layer with a pore size smaller than the pore size of the substrate, coated and laminated on the surface of the substrate.

TABLE 6

|  | No. 18 | No. 19 |
| --- | --- | --- |
| Presence or absence of falling off of particles | ◯ | ◯ |

TABLE 6-continued

|  | No. 18 | No. 19 |
|---|---|---|
| Powder removal property | ◯ | ◯ |
| Fine particle collecting property | ◯ | ◯ |
| Contact angle to water (°) | 93 | 94 |
| Pressure loss (mmAq) | 45 | 13 |

As shown in Table 6, in Test Nos. 18 and 19 for the electrostatic coating method or the static forming method employing a molding tool comprising an outer mold of e.g. a cylindrical shape and an inner mold inserted inside thereof and a plastic material having a small average particle size with a crosslinking degree of 77% obtained by irradiating γ-rays of 200 KGy to low density polyethylene, no falling of particles or no inclusion of fine particles in the flow-out side fluid, was observed, and the products had adequate filter properties. With respect to the pressure loss, the results were good in each case.

Test Nos. 20 and 21

The respective filters were prepared in the manner as described below, and the filter properties were evaluated by the methods as described above. The results are shown in Table 7.

Test No. 20

Using the same cylindrical inner and outer molds as used in Test No. 13, firstly, ultrahigh molecular weight polyethylene of a botryoid resin particle shape having an average particle size of 150 μm, a viscosity average molecular weight of 4,000,000 and a bulk density of 0.42 g/cm$^3$, was filled into a primary mold cavity of a molding tool comprising the cylindrical inner and outer molds, which had the primary mold cavity with a width required to obtain a layer thickness ratio of 70% of a final thickness of a porous plastic filter of 3 mm, and then heated for from 30 to 90 minutes at a temperature of from 160° to 220° C. to obtain a large average particle size porous layer having a large pore size. Then, the cylindrical outer mold was replaced in the same manner as in Test No. 13, and ultrahigh molecular weight polyethylene having an average particle size of 40 μm, a viscosity average molecular weight of 2,000,000 and a melt flow rate of not higher than 0.01, was filled into a secondary mold cavity formed by the outer surface of the above large average particle size porous layer and the replaced cylindrical outer mold so that the layer thickness ratio would be 30% of the total thickness of the filter, and then heated for from 20 to 30 minutes at a temperature of from 160° to 220° C. to obtain a plastic filter of a cylindrical shape with a total wall thickness of two layers of 3 mm, which had a small average particle size porous layer having a small pore size on the outer surface side of the cylinder i.e. the fluid flow-in side and a large average particle size porous layer having a large pore size on the inner surface side of the cylinder i.e. the fluid flow-out side.

Test No. 21

Using the same cylindrical inner and outer molds as used in Test No. 13, firstly, ultrahigh molecular weight polyethylene of bulky resin particles having an average particle size of 120 μm, a viscosity average molecular weight of 4,000,000 and a bulk density of 0.46 g/cm$^3$, was filled into a primary mold cavity of a molding tool comprising the cylindrical inner and outer molds, which had the primary mold cavity with a width required to obtain a layer thickness ratio of 70% of a final thickness of a porous plastic filter of 3 mm, and then heated for from 30 to 90 minutes at a temperature of from 160° to 220° C. to obtain a large average particle size porous layer having a large pore size. Then, the cylindrical outer mold was replaced in the same manner as in Test No. 13, and ultrahigh molecular weight polyethylene having an average particle size of 40 μm, a viscosity average molecular weight of 2,000,000 and a melt flow rate of not higher than 0.01, was filled into a secondary mold cavity formed by the outer surface of the above large average particle size porous layer and the replaced cylindrical outer mold so that the layer thickness ratio would be 30% of the total thickness of the filter, and then heated for from 20 to 30 minutes at a temperature of from 160° to 220° C. to obtain a plastic filter of a cylindrical shape with a total wall thickness of two layers of 3 mm, which had a small average particle size porous layer having a small pore size formed on the outer surface side of the cylinder i.e. the fluid flow-in side and a large average particle size porous layer having a large pore size formed on the inner surface side of the cylinder i.e. the fluid flow-out side.

TABLE 7

|  | No. 20 | No. 21 |
|---|---|---|
| Tensile strength (kg/cm$^2$) | 35 | 17 |
| Elongation (%) | 19 | 7 |
| Pressure loss (mmAq) | 33 | 30 |
| Presence or absence of falling off of particles | ◯ | ◯ |
| Powder removal property | ◯ | ◯ |
| Fine particle collecting property | ◯ | ◯ |
| Contact angle to water (°) | 97 | 95 |

As shown in Table 7, in Test No. 20 in which ultrahigh molecular weight polyethylene having a botryoid resin particle shape was used, high tensile strength and elongation were obtained without deterioration of the pressure loss. In Test No. 21, the tensile strength and the elongation decreased although no deterioration was observed with respect to the pressure loss.

Test Nos. 22 and 23

The respective filters were prepared in the manner as described below, and the filter properties were evaluated by the methods as described above. The results are shown in Table 8.

Test No. 22

Ultrahigh molecular weight polyethylene having an average particle size of 30 μm, a viscosity average molecular weight of 2,000,000 and a melt flow rate of not higher than 0.01, was filled into a star-shaped mold cavity formed by inner and outer molds, which had a width required to obtain a final thickness of the porous plastic filter of 3 mm, and then heated for from 30 to 90 minutes at a temperature of from 160° to 220° C. to obtain a porous plastic filter of a star-shaped cross section as shown in FIG. 1 with a wall thickness of 3 mm.

Test No. 23

Ultrahigh molecular weight polyethylene having an average particle size of 30 μm, a viscosity average molecular weight of 2,000,000 and a melt flow rate of not higher than 0.01, was filled into the same molding tool as used in Test No. 1, and then heated for 30 minutes at a temperature of from 160° to 220° C. to obtain a porous plastic filter of a cylindrical shape with a wall thickness of 3 mm, which was composed solely of the ultrahigh molecular weight polyethylene.

TABLE 8

|  | No. 22 | No. 23 |
| --- | --- | --- |
| Presence or absence of falling off of particles | ○ | ○ |
| Powder removal property | ○ | ○ |
| Fine particle collecting property | ○ | ○ |
| Contact angle to water (°) | 95 | 97 |
| Pressure loss (mmAq) | 69 | 86 |
| Filtration area ratio per unit volume | 1.5 | 1.0 |

As shown in Table 8, in Test Nos. 22 and 23, the results were good without any problem with respect to falling off of particles, inclusion of fine particles in the flow-out side fluid or the powder removal property.

With the star-shaped cross-sectional filter, the filtration area per unit volume increases as compared with a filter of a cylindrical shape, whereby selection for e.g. the filtration capacity of the separation apparatus, the capacity of the apparatus, the installation area, etc. can easily be made, and this is advantageous from the viewpoint of designing the apparatus and installation.

As described in the foregoing, the porous plastic filter of the present invention is the one constructed so that the contact angle to water of at least one surface is at least 60°, preferably at least 90°, and the average particle size of the thermoplastic particles is within a range of from 5 to 90 μm, and the one wherein either the side to which a fluid such as a liquid or gas containing fine particles to be removed by the porous plastic filter, flows in or the side from which the fluid flows out, is constituted by a small particle porous layer prepared by sinter-forming a plastic material having a small average particle size, and the other side is constituted by a large particle porous layer prepared by sinter-forming a plastic material having an average particle size larger than the average particle size of the above small particle porous layer, to have at least two layers, whereby it is possible to present a porous plastic filter for separating fine particles, which has a good powder removal property and an ability for collecting fine particles on the surface and which is free from such conventional problems as falling off of PTFE particles and inclusion thereof in the collected fine particles.

Further, the process for producing a multilayer porous plastic filter of the present invention has merits such that the production efficiency is good, and adjustment of the thickness of each layer can certainly be made.

What is claimed is:

1. A porous plastic filter for separating fine particles comprising a thermoplastic material, wherein the porous plastic filter is obtained by sinter-forming particles of the thermoplastic material, wherein the contact angle to water of at least one surface of the porous plastic filter is at least 60°, and wherein the thermoplastic material consists of an ultrahigh molecular weight polyethylene having an average particle size within a range of from 10 to 90 μm.

2. The porous plastic filter according to claim 1, wherein the porous plastic filter is constituted by a plurality of thermoplastic materials, and at least one of which is an ultrahigh molecular weight polyethylene having an average particle size within a range of from 5 to 90 μm.

3. The porous plastic filter according to claim 1, wherein the porous plastic filter is constituted by a plurality of thermoplastic materials, at least one of which is a fluorine-type plastic material.

4. The porous plastic filter according to claim 3, wherein the fluorine-type plastic material is made of polytetrafluoroethylene or polyfluoroalkyl acrylate, and its blend proportion is within a range of from 0.1 to 50 wt %, based on the total amount of the thermoplastic materials.

5. A porous plastic filter according to claim 1, wherein the porous plastic filter is constituted by a plurality of thermoplastic materials, wherein at least thermoplastic materials having an average particle size within a range of from 5 to 90 μm and an average particle size within a range of more than 90 μm and not more than 1,000 μm, are used.

6. The porous plastic filter according to claim 5, which is constituted by thermoplastic materials having an average particle size within a range of from 5 to 90 μm and an average particle size within a range of more than 90 μm and not more than 1,000 μm, wherein the blend proportion of the thermoplastic material having an average particle size within a range of from 5 to 90 μm, is at least 20 wt %, based on the total amount of the thermoplastic materials.

7. The porous plastic filter according to claim 1, which has a star-shaped cross section.

8. The porous plastic filter according to claim 1, wherein said ultrahigh molecular weight polyethylene has a viscosity average molecular weight of at least 1,000,000.

9. The porous plastic filter according to claim 1, wherein said average particle size is within a range of 10 to 60 μm.

10. The porous plastic filter according to claim 1, wherein said contact angle is at least 90°.

11. A multilayer porous plastic filter made of sintered particles of thermoplastic material, which comprises at least two layers formed by combining and unifying (a) a small particle porous layer obtained by sinter-forming a particulate thermoplastic material having an average particle size of 5 to 90 μm, for either the side to which a liquid or gas fluid containing fine particles to be removed by the porous plastic filter flows in, or the side from which the fluid flows out, and (b) a large particle porous layer obtained by sinter-forming a particulate plastic material having an average particle size larger than the average particle size of the plastic material for said small particle porous layer, for the other side, wherein the contact angle to water of the surface of said small particle porous layer is at least 60°, and wherein the thickness ratio of the small particle porous layer to the large particle porous layer is within a range of 1:99 to 70:30.

12. The porous plastic filter according to claim 11, wherein the average particle size of the particles of the thermoplastic material constituting the small particle porous layer is from 5 to 90 μm, and the average particle size of the particles of the thermoplastic material constituting the large particle porous layer is within a range of more than 90 μm and not more than 1,000 μm.

13. The porous plastic filter according to claim 11, wherein the particles of the thermoplastic material constituting the small particle porous layer are particles of a polyolefin type plastic material irradiated with radiation.

14. The porous plastic filter according to claim 11, wherein the thermoplastic material constituting the small particle porous layer is at least an ultrahigh molecular weight polyethylene.

15. The porous plastic filter according to claim 11, wherein the thermoplastic material constituting the small particle porous layer is composed of a plurality of thermoplastic materials, at least one of which is a fluorine-type plastic material.

16. The porous plastic filter according to claim 15, wherein the thermoplastic material constituting the small particle porous layer is composed of a plurality of thermoplastic materials, at least one of which is polytetrafluoroethylene or polyfluoroalkyl acrylate, wherein the blend ratio thereof is within a range of from 0.1 to 50 wt %, based on the total amount of the thermoplastic materials.

17. The porous plastic filter according to claim 11, wherein the thermoplastic material constituting the small particle porous layer is composed of a plurality of thermoplastic materials, at least one of which is a thermoplastic material having an average particle size within a range of from 5 to 90 μm and an average particle size within a range of more than 90 μm and not more than 1,000 μm.

18. The porous plastic filter according to claim 17, wherein the thermoplastic material constituting the small particle porous layer is composed of a thermoplastic material having an average particle size within a range of from 5 to 90 μm and a thermoplastic material having an average particle size within a range of more than 90 μm and not more than 1,000 μm, wherein the blend proportion of the thermoplastic material having an average particle size within a range of from 5 to 90 μm, is at least 20 wt %, based on the total amount of the thermoplastic materials.

19. The porous plastic filter according to claim 11, wherein the particles of the thermoplastic material constituting the large particle porous layer are of a botryoid ultrahigh molecular weight polyethylene.

20. The porous plastic filter according to claim 19, wherein the botryoid ultrahigh molecular weight polyethylene has an average particle size of from 100 to 200 μm, and a bulk density of from 0.35 to 0.45 g/cm$^3$.

21. The multilayer porous plastic filter according to claim 11, wherein said contact angle is at least 90°.

22. A process for producing a multilayer porous plastic filter, which comprises assembling a molding tool comprising an inner mold and a replaceable outer mold to form a primary mold cavity capable of forming a layer thickness corresponding to particles of a thermoplastic material to be filled, then filing into this primary mold cavity at least a small particulate thermoplastic material having an average particle size within a range of from 5 to 90 μm or a large particulate thermoplastic material having an average particle size larger than the above average particle size, followed by sintering it to form a small particle porous layer or a large particle porous layer, then replacing the previously used outer mold with another outer mold having an inner diameter larger than the previously used outer mold, to form a secondary mold cavity on the outer surface side of the above porous layer, further filling into the secondary mold cavity a large particulate thermoplastic material having an average particle size larger than the above small particulate thermoplastic material, or the above small particulate thermoplastic material, followed by sintering it to form a large particle porous layer on the outer surface of the above small particle porous layer, or a small particulate porous layer on the outer surface of the large particle porous layer, so that the small particle porous layer having a contact angle to water of at least 60°, is combined and unified with the large particle porous layer.

23. The process for producing a multilayer porous plastic filter according to claim 22, wherein the molding tool comprises a hollow elongated inner mold and a hollow elongated outer mold.

24. The process according to claim 22, wherein said contact angle is at least 90°.

25. A process for producing a multilayer porous plastic filter, which comprises subjecting a particulate thermoplastic material having a predetermined average particle size to primary sintering to form a porous plastic substrate, imparting electrical conductivity by a conductive material to the surface of the porous portion of the substrate, then electrostatically coating at least a small particulate thermoplastic material which has a compatibility with the substrate and which has an average particle size within a range of from 5 to 90 μm which is smaller than the particles constituting the porous plastic substrate, then subjecting the porous plastic substrate to secondary sintering to form a small particle porous layer having pores with a diameter smaller than the pore diameter of the substrate at least on the porous portion of the porous plastic substrate, so that the small particle porous layer having a contact angle to water of at least 60°, is coated and fused on the outer surface of the porous plastic substrate, and the small particle porous layer and the large particle porous layer are combined and unified.

26. The process for producing a multilayer porous plastic filter according to claim 25, wherein the thermoplastic material having an average particle size smaller than the particles constituting the porous plastic substrate, is a polyolefin type plastic material irradiated with radiation.

27. The process according to claim 25, wherein said contact angle is at least 90°.

* * * * *